J. E. CONNOLLY.
GARBAGE CAN FLYTRAP.
APPLICATION FILED APR. 18, 1918.
1,321,286.
Patented Nov. 11, 1919.
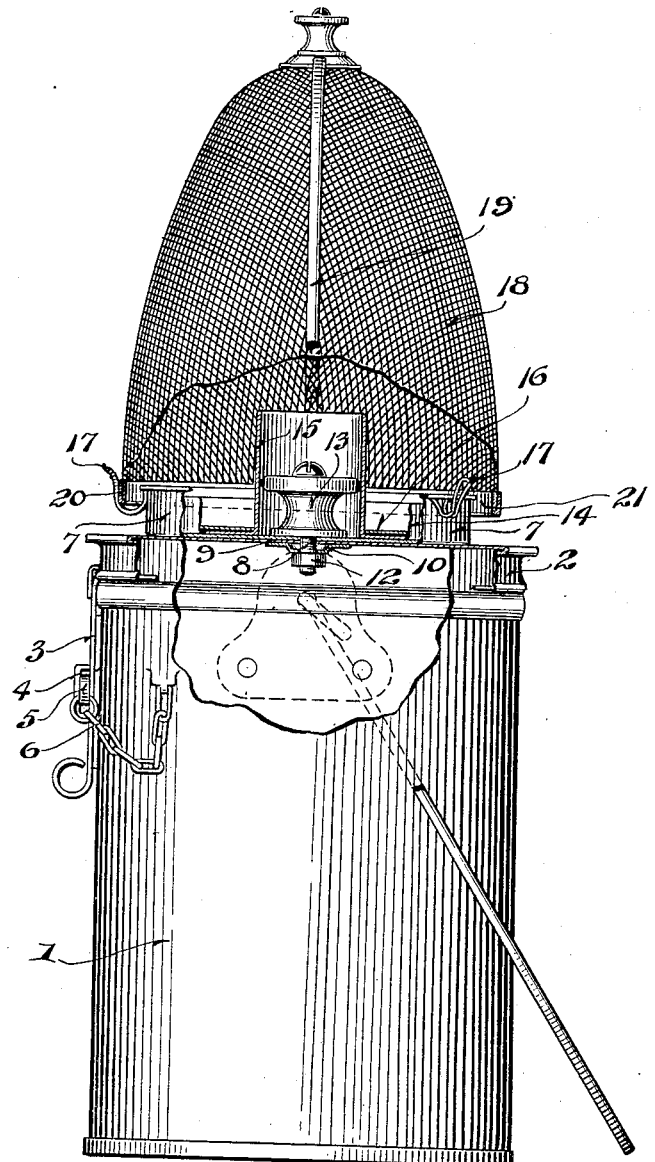
Inventor!
John E Connolly
Ursell, Keeney & French.
Attorneys.

UNITED STATES PATENT OFFICE.

JOHN E. CONNOLLY, OF RACINE, WISCONSIN.

GARBAGE-CAN FLYTRAP.

1,321,286. Specification of Letters Patent. Patented Nov. 11, 1919.

Application filed April 18, 1918. Serial No. 229,435.

*To all whom it may concern:*

Be it known that I, JOHN E. CONNOLLY, a citizen of the United States, and resident of Racine, in the county of Racine and State of Wisconsin, have invented new and useful Improvements in Garbage-Can Flytraps, of which the following is a description, reference being had to the accompanying drawings, which are a part of this specification.

The invention relates to fly traps and more particularly to a garbage can fly trap.

In fly time the flies invariably collect in vast numbers about garbage cans filled with matter in different stages of decay and the odor from this matter attracts the flies. Different methods are being used to kill off flies because of their liability to spread disease and in the present instance I have provided a garbage can fly trap in which the garbage in the can serves to attract the flies to a trap upon the cover of the can so that vast numbers of flies may be accounted for.

The invention further consists in the novel parts and combinations of parts hereinafter set forth.

The drawing shows a device embodying the invention, parts being broken away and parts being shown in section.

In the drawing, the numeral 1 designates a garbage can or container which is provided with a removable cover 2 fitting over the top of the can. The cover is locked to the can by a fastener 3 on the cover insertible over an eyed fitting 4 on the can and held to the fitting by a pin 5 connected to the can by a flexible chain 6.

The cover 2 carries a fly trap consisting of a circular pan 7 forming a base which is secured to the cover by a bolt 8 passing through an operture 9 in said pan and through an aperture 10 in the cover and carrying a nut 12 at one end and a knob 13 at its other end. Insertible within the pan 7 and closely fitting against the sides of the same and removable therefrom is a circular removable pan 14 having a central tubular projection 15 surrounding the knob 13. This removable pan 14 contains the usual poison paper 16 or other suitable fly paper. The pan 7 is provided with spring hooks 17 spaced from each other, three hooks being used but only two being shown. A conical screened cover 18 having reinforcing ribs 19 and a lower circular edge 20 bound with metal is secured to the pan 7 by the hooks 17 engaging the edge 20, the lower edge 20 being of larger diameter than the pan 7 so as to form an annular opening 21 to permit the flies to pass from the outside into the screened space and into the removable pan 14.

The trap may be removed from the cover 2 by removing the bolt 8 and the bolt 8 with its knob 13 may be again connected to the cover when it is not desired to use the trap.

With this construction, the odor of the garbage attracts the flies to the can and on entering the trap they are caught and access to the removable pan 14 is readily obtained to remove the captured flies and replace the fly paper by removing the cover 18. The device is simple but owing to the combination of parts is an efficient means for catching flies.

While I have shown the top of the can closed it will be apparent that the flies will be attracted to the can because of the practical impossibility of confining the odor of the garbage but if desired holes may be made in the cover 2 to increase the attraction.

I am aware that the details of construction herein shown and described are capable of some modification and change and I therefore desire it to be understood that such changes in construction as come within the scope of the appended claims are within the spirit of my invention.

What I claim as my invention is:

1. In a device of the class described, the combination with a container and a removable cover therefor having a knob centrally mounted on its top side, of an insect trap comprising a fixed pan, common means securing said pan and said knob to the cover, a removable pan nested inside of said fixed pan, a central tubular projection formed in the bottom wall of said removable pan and projecting beyond the top of said knob to protect the same from insect killing substance adapted to be disposed in said pan, and a removable screen cover supported above said insect pans and having a passageway between the lower peripheral edge thereof and said fixed pan.

2. In a device of the class described, the combination with a container and a removable cover therefor, of an insect trap comprising a pan fixed to the top side of said removable cover, a removable pan nested inside of said fixed pan and adapted to receive an insect killing substance, a removable screen cover supported above said insect pan and having a passageway between the lower peripheral edge thereof and said fixed pan, and spaced apart resilient members carried by said fixed pan and readily removably supporting said cover in position.

In testimony whereof, I affix my signature.

JOHN E. CONNOLLY.

Copies of this patent may be obtained for five cents each, by addressing the "Commissioner of Patents, Washington, D. C."